United States Patent
Liu et al.

(10) Patent No.: US 12,197,584 B2
(45) Date of Patent: Jan. 14, 2025

(54) METHOD FOR RESISTING FAULT INJECTION ATTACKS IN SECURE BOOT

(71) Applicant: Beken Corporation, Shanghai (CN)

(72) Inventors: Zhifu Liu, Shanghai (CN); Zhilei Wang, Shanghai (CN); Pujie Yang, Shanghai (CN)

(73) Assignee: Beken Corporation, Shanghai (CN)

( * ) Notice: Subject to any disclaimer, the term of this patent is extended or adjusted under 35 U.S.C. 154(b) by 156 days.

(21) Appl. No.: 18/171,587

(22) Filed: Feb. 20, 2023

(65) Prior Publication Data
US 2024/0211603 A1    Jun. 27, 2024

(30) Foreign Application Priority Data
Dec. 26, 2022   (CN) .......................... 202211677831.3

(51) Int. Cl.
*G06F 21/57* (2013.01)
*G06F 21/60* (2013.01)

(52) U.S. Cl.
CPC .......... *G06F 21/575* (2013.01); *G06F 21/602* (2013.01); *G06F 2221/034* (2013.01)

(58) Field of Classification Search
CPC .... G06F 21/575; G06F 21/572; G06F 21/602; G06F 21/554
See application file for complete search history.

(56) References Cited

U.S. PATENT DOCUMENTS

| | | | |
|---|---|---|---|
| 11,698,969 B1* | 7/2023 | Henriquez Garcia | G06F 21/572 726/23 |
| 2013/0024930 A1* | 1/2013 | Steil | G06F 21/575 726/16 |
| 2020/0097658 A1* | 3/2020 | Samuel | G06F 11/0793 |
| 2020/0210587 A1* | 7/2020 | Shi | G11C 29/24 |
| 2020/0342112 A1* | 10/2020 | Plusquellic | G06F 21/602 |
| 2020/0344265 A1* | 10/2020 | Kelly | H04L 63/0823 |
| 2021/0056207 A1* | 2/2021 | Tiwari | G06F 8/65 |
| 2021/0232690 A1* | 7/2021 | Nomura | G06F 21/572 |
| 2022/0052854 A1* | 2/2022 | Kaster | H04L 9/0894 |
| 2022/0382873 A1* | 12/2022 | Soni | G06F 21/572 |
| 2023/0127971 A1* | 4/2023 | Jaouen | G06F 21/57 726/22 |
| 2023/0129830 A1* | 4/2023 | Ghetie | G06F 21/554 726/23 |
| 2023/0327883 A1* | 10/2023 | Ansari | G06F 21/57 713/2 |

* cited by examiner

*Primary Examiner* — Jaweed A Abbaszadeh
*Assistant Examiner* — Cheri L Harrington
(74) *Attorney, Agent, or Firm* — Schwegman Lundberg & Woessner, P.A.

(57) ABSTRACT

A method for resisting fault injection attacks during secure boot is provided. The method may include: performing a secure check on a System-on-Chip (SoC), wherein one or more pre-determined values are written on one or more bits of a first register of the SoC during the secure check; reading one or more corresponding bits of a second register of the SoC; and comparing the values of the one or more bits of the second register with the values of the one or more corresponding bits of the first register. In response to a comparison result that the values of the one or more bits of the second register are the same as the values of the one or more corresponding bits of the first register, the SoC is booted.

16 Claims, 10 Drawing Sheets

130

PUBLIC KEY HASH VALUE 422

FIG. 4C

METHOD FOR RESISTING FAULT INJECTION ATTACKS IN SECURE BOOT

CROSS REFERENCE TO RELATED APPLICATION

This application claims priority to and incorporates by reference Chinese patent application no. 202211677831.3 filed 26 Dec. 2022.

TECHNICAL FIELD

The present disclosure generally relates to secure boot. In particular, example embodiments of the present disclosure address systems and methods for resisting fault injection attacks in a secure boot of an internet of things (IoT) device.

BACKGROUND

The "Internet of Things" or "IoT" is a network of physical objects (referred to as "smart devices" or "IoT devices") that are embedded with sensors, software, and other technologies for enabling connection and exchange of data with other devices via the Internet. For example, the IoT devices are used in home automation to control lighting, heating and air conditioning, media and security systems, and camera systems. A number of IoT devices have been provided that function as smart home hubs to connect different smart home products. IoT devices have been used in a number of other applications as well. Application layer protocols and supporting frameworks have been provided for implementing such IoT applications.

The secure boot of IoT devices is an important process realized by software programs permanently written in a Read-only Memory (ROM). It uses a public key stored in a one-time programmable (OTP) memory to verify one or more programs to be executed. If the verification is successful, programs at subsequent levels are loaded and verified, and the process repeats. In this way, a chain of trust is formed, and the secure boot is the foundation and source of the chain of trust.

Conventionally, the secure boot of an IoT device can be easily attacked by fault injection attacks that cause one or more bits in memories of the IoT device to flip. The flipped bits may then either cause secure check operations during the secure boot to be skipped or cause determination results of the secure check operations to be modified.

SUMMARY

According to one aspect of the present disclosure, a method for resisting fault injection attacks is provided. The method may include performing a secure check on a System-on-Chip (SoC), wherein one or more pre-determined values are written on one or more bits of a first register of the SoC during the secure check. The method may further include reading one or more corresponding bits of a second register of the SoC, wherein the one or more pre-determined values are pre-written on the one or more bits of the second register. The method may further include comparing the values of the one or more bits of the second register with the values of the one or more corresponding bits of the first register. In response to a comparison result that the values of the one or more bits of the second register are the same as the values of the one or more corresponding bits of the first register, the SoC may be booted.

According to another aspect of the present disclosure, a SoC is provided. The SoC may include a second register and a processor. The second register may be configured to store one or more bits, wherein one or more pre-determined values are pre-written on the one or more bits of the second register.

The processor may be configured to perform a secure check on the SoC, wherein the one or more pre-determined values are written on one or more corresponding bits of a first register of the SoC during the secure check. The processor may be further configured to read the one or more bits from the second register and compare the values of the one or more bits of the second register with the values of the one or more corresponding bits of the first register. In response to a comparison result that the values of the one or more bits of the second register are the same as the values of the one or more corresponding bits of the first register, the processor may be further configured to boot the SoC.

According to another aspect of the present disclosure, a non-transitory computer-readable storage medium is provided. The computer-readable storage medium may include instructions. When executed by a computer, the instructions may cause the computer to perform a secure check on a System-on-Chip (SoC), wherein one or more pre-determined values are written on one or more bits of a first register of the SoC during the secure check. When executed by the computer, the instructions may further cause the computer to read one or more corresponding bits of a second register of the SoC, wherein the one or more pre-determined values are pre-written on the one or more bits of the second register. When executed by the computer, the instructions may further cause the computer to compare the values of the one or more bits of the second register with the values of the one or more corresponding bits of the first register. In response to a comparison result that the values of the one or more bits of the second register are the same as the values of the one or more corresponding bits of the first register, the SoC may be booted.

BRIEF DESCRIPTION OF THE DRAWINGS

To easily identify the discussion of any particular element or act, the most significant digit or digits in a reference number refer to the figure number in which that element or act is first introduced.

FIG. 4C is a schematic diagram illustrating data stored in a third register memory of the IoT device, in accordance with some example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned above, a fault injection attack may cause one or more bits in a memory of an IoT device to flip from "0" to "1" or vice versa. For example, by changing a value of a secure boot flag from b00000001 (which corresponds to a Boolean value of "True") to b00000000 (which corresponds to a Boolean value of "False"), the IoT device may mistakenly believe that the secure boot should be skipped.

The present disclosure compares pre-determined values in two register memories to determine whether a fault injection attack occurs. First, one or more preset values are permanently written on a second register memory. The values may be written during the manufacture of the IoT device. During the secure boot of the IoT device, the IoT device may write (using software) the same one or more preset values on a first register memory. In theory, the values in the two registers are the same after the secure boot. However, when a fault injection attack occurs, the values in the first register memory written by software are changed while the permanently written values in the second register memory remain the same. Thus, whenever a fault injection attack occurs, the values in two register memories do not match anymore.

Additionally, one of multiple points (each point corresponding to, e.g., 32 bits) may be written on the first register after each of one or more secure check operations during the secure boot is performed. The unmatched points can indicate during or after which operation the attack occurs. The IoT device may also identify a skipped operation if points in two register memories are unmatched and the point in the first register is zero or a default value.

Therefore, the present disclosure potentially has at least the following four advantages:
1. Register memories written by hardware have better resistance (almost absolute resistance) to fault injection attacks.
2. Secure boot operation(s) during which the fault injection attack(s) occurs can be easily identified.
3. The process of secure boot is minimally modified.
4. The hardware-based attack resistance method is compatible with a software-based attack resistance method.

Figure 1:
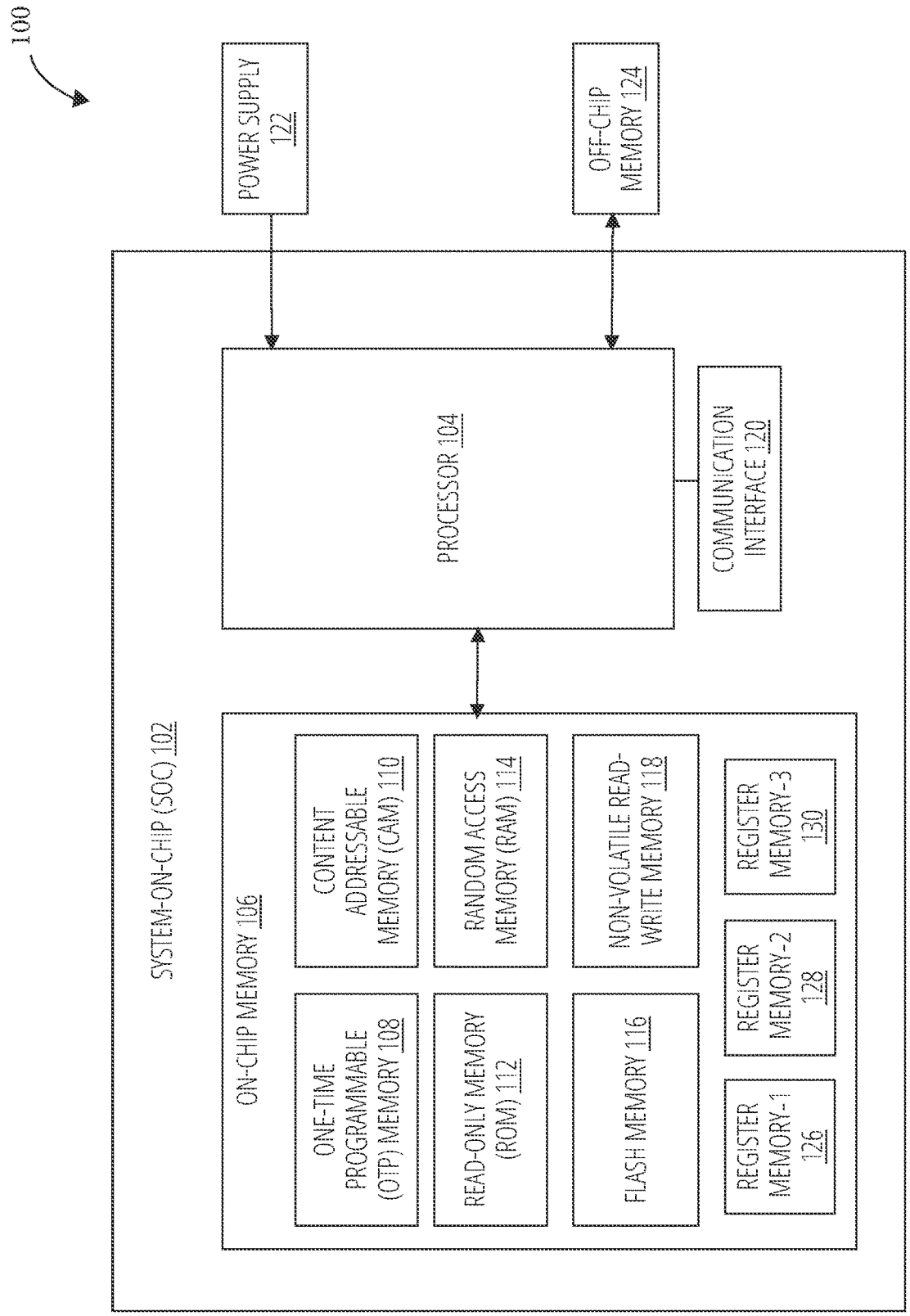
FIG. 1 is a block diagram illustrating an internet of things (IoT) device, in accordance with some example embodiments.

FIG. 1 is a block diagram illustrating an internet of things (IoT) device 100, in accordance with some example embodiments. The IoT device 100 may include a system-on-chip (SoC) 102, a power supply 122, and an off-chip memory 124. The SoC 102 may include a processor 104, on-chip memories 106, and a communication interface 120. The on-chip memories 106 may include a one-time programmable (OTP) memory 108, a content addressable memory (CAM) 110, a read-only memory (ROM) 112, a random-access memory (RAM) 114, a flash memory 116 and/or a non-volatile read-write memory (NVM) 118.

The processor 104 may perform arithmetical, logical, input/output (I/O), and other basic instructions. The processor 104 may make determinations, receive data from, and/or send data/instructions to other components of the IoT device 100.

The OTP memory 108 may be a special non-volatile memory that permits data to be written only once. Once the memory has been programmed, it retains its value upon losing power. OTP memory 108 may be used in applications where reliable and repeatable reading of data is required. Examples include boot code, encryption keys, and configuration parameters for analog, sensor, or display circuitry. In some embodiments, the OTP memory 108 may be replaced by an electronic fuse (eFuse) or a physical unclonable function (PUF).

The CAM 110 may be a data storage device that stores memory in cells. When any aspect of the memory is entered, the CAM 110 may compare the input with all the stored data. In the CAM 110, memories are not arranged in chronological order and are not packed in isolated modules.

The ROM 112 is a type of electronic storage built into the IoT device 100 during manufacturing. The ROM 112 may store "firmware," which is permanent software that's hardwired with integrated circuits. The manufacturer may fit a specifically designed ROM chip into a device during the building process. Unlike the non-volatile memory of a hard drive, it's difficult and time-consuming to rewrite the ROM 112.

The RAM 114 is a form of memory that can be read and changed in any order, typically used to store working data and machine code. The RAM 114 may allow data items to be read or written in almost the same amount of time irrespective of the physical location of data inside the memory, in contrast with other direct-access data storage media, where the time required to read and write data items varies significantly depending on their physical locations on the recording medium, due to mechanical limitations such as media rotation speeds and arm movement.

The flash memory 116 is a long-life and non-volatile storage chip widely used in embedded systems. The flash memory 116 can keep stored data and information even when the power is off. The flash memory 116 can be electrically erased and reprogrammed. Because the flash memory 116 can be easily modified (in other words, attacked), the flash memory 116 may include additional data for secure purposes, such as a public key, an image hash value, a manifest signature, etc.

The NVM 118 is a type of computer memory that has the capability to hold saved data even if the power is turned off. Unlike volatile memory, NVM 118 does not require its memory data to be periodically refreshed. As mentioned above, the ROM 112 is a type of NVM, and the OTP memory 108, after programming once, also becomes a type of NVM. The NVM 118 herein may refer to other non-volatile memories. In some embodiments, the NVM 118 may be omitted.

The communication interface 120 may facilitate communication between the IoT device 100 or a component thereof with an external device. The communication may be wired or wireless.

The power supply 122 may be an electrical device that supplies electric power to the SoC 102. In some embodiments, whenever the power supply 122 is turned on, the SoC 102 may perform a secure boot.

The off-chip memory 124 may be a memory that is not on the SoC 102. The off-chip memory 124 generally has more latency than on-chip memories 106, meaning less frequently used or less critical data may be stored in the off-chip memory 124. In some embodiments, the off-chip memory 124 may work as a substitute for one or more on-chip memories 106.

The on-chip memory 106 may further include a plurality of register memories (e.g., register memory-1 126, register memory-2 128, and register memory-3 130). Register memories are small and fast memories that hold data.

In some embodiments, the register memory-1 126 and the register memory-2 128 may each include one or more data points. The data points in the register memory-2 128 may be permanently written during the manufacture of the IoT device 100, while the data points in the register memory-1 126 may be written by software during a secure boot of the IoT device. Register memory-1 126 and register memory-2 128 may further include data related to secure boot, such as image hash values, digital signatures, etc. Register memory-3 130 may include additional data related to secure boot, such as public key hash value. Details regarding the data stored in register memories may be found elsewhere in the present disclosure. See, e.g., FIGS. 4A-4C and descriptions thereof.

It should be noted that register memories may be combined or omitted. For example, register memory-1 126 and register memory-3 130 may be combined. Alternatively, register memory-1 126, register memory-2 128, and register memory-3 130 may be combined as a single register memory. As another example, register memory-1 126 and register memory-2 128 may be omitted. It should also be noted that the register memories may be located in any memories of the on-chip memory 106 of the IoT device 100 or embedded in the processor 104. Also, the register memories can be replaced by any other types of memory. Such variations are also within the protection scope of the present disclosure.

In some embodiments, the IoT device 100 may further include functional components based on desired functions of the IoT device 100. For example, the IoT device 100 may include a sensor, a speaker, a display, a light, a camera, a microphone, or the like, or any combination thereof.

It should be noted that although the present disclosure is described using the IoT device as an example, the present disclosure may be used in any other applicable systems or devices without departing from the spirit of the present disclosure. For example, the present method can be used by any device, including a SoC with a demand of resisting fault injection attacks, or even a device including only a flash memory, an OTP memory, and a processor, with a demand of resisting fault injection attacks or other types of attacks.

Figure 2:
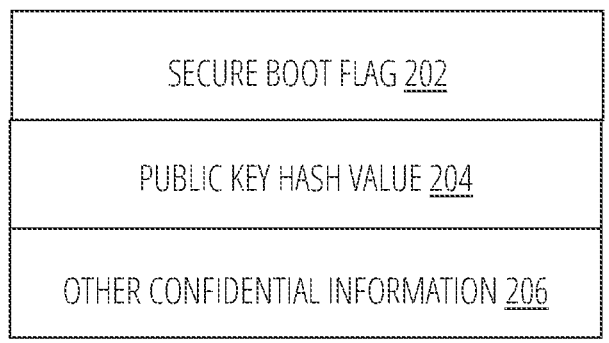
FIG. 2 is a schematic diagram illustrating data stored in a one-time programmable (OTP) memory of the IoT device, in accordance with some example embodiments.

FIG. 2 is a schematic diagram illustrating data stored in a one-time programmable (OTP) memory 108 of the IoT device 100, in accordance with some example embodiments. As shown in FIG. 2, the OTP memory 108 may include a secure boot flag 202, a public key hash value 204, and other confidential information 206.

The secure boot flag 202 may include one or more bits. Based on a preset correlation, the one or more bits may refer to a Boolean value of "True" or "False." For example, "b00000001" may refer to "True," and "b00000000" may refer to "False." Alternatively, "0xabcdabcd" may refer to "True," and 0x12345678 may refer to "False." The correlation between bit values and Boolean values is preset during the manufacture of the IoT device 100 and is not limiting. As used herein, a "True" is also named an "On" status, and a "False" is also named an "Off" status.

When the secure boot flag 202 is at an "On" status, secure check operations are performed; when the secure boot flag 202 is at an "Off" status, secure check operations are skipped. It should be noted that although the secure boot flag 202 are written on the OTP memory 108 which cannot be easily modified by fault injection attacks, there are other writable memories that store the secure boot flag. A fault injection attacker may either change a reading result of the software program on the secure boot flag 202 from an "On" status to an "Off" status or simply change a secure boot flag stored in a writable memory from an "On" status to an "Off" status. Either attack may cause the secure check operations to be skipped. Then, malware, viruses, and damaged documents are executed without a secure check.

Therefore, the present disclosure performs both a hardware and a software check on the status of the secure boot flag 202 and compares the check results to determine whether the secure boot flag 202 is actively turned off by a manufacturer or maliciously changed by an attacker. Specifically, the hardware result may reflect an actual status of the secure boot flag and the software result, compared with the hardware result, reflects whether a fault injection attack occurs. Details regarding the check on the status of the secure boot flag 202 may be found elsewhere in the present disclosure. See, e.g., method 800 and descriptions thereof.

The public key hash value 204 may be a value calculated based on a public key (e.g., public key 304) using a cryptographic algorithm. The cryptographic algorithm may include a secure hash algorithm (SHA) and/or a message authentication code (MAC) algorithm, or other algorithm(s). The SHA algorithm may include an SHA-2 algorithm and/or an SHA-3 algorithm. The SHA-2 algorithm may include an SHA-224 algorithm, an SHA-256 algorithm, an SHA-384 algorithm, and/or an SHA-512 algorithm.

Merely by way of example, the length of the public key hash value 204 may be associated with the used cryptographic algorithm. For example, the public key hash value 204 is generated using an SHA-256 algorithm and is 256-bit long. In some embodiments, the public key hash value 204 may be pre-calculated and preset by the IoT device 100 or a designer or manufacturer before the IoT device 100 is released to the public. The public key hash value 204 may be compared with a public key hash value written on a register memory during the secure boot (e.g., the public key hash value 422 of the register memory-3 130). If the public key hash value 204 is different from the public key hash value 422, the IoT device 100 may determine that the IoT device 100 is attacked.

The other confidential information 206 may include information related to the secure boot of the IoT device 100. For example, the other confidential information 206 may include preset addresses of a patch and hash values related to the patch.

Figure 3:
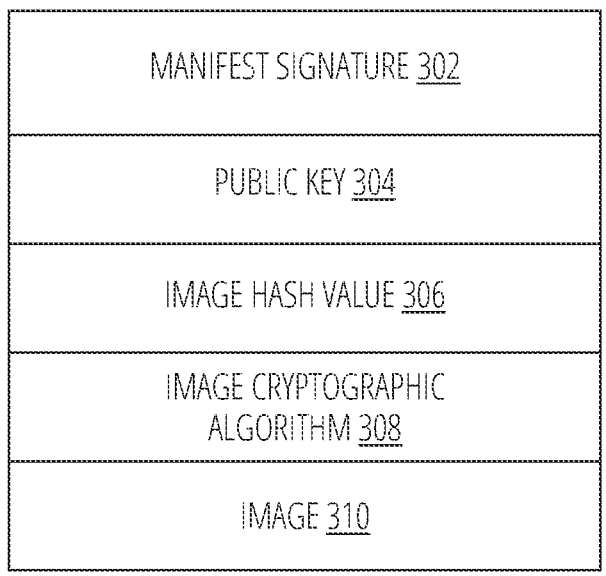
FIG. 3 is a schematic diagram illustrating data stored in a flash memory of the IoT device, in accordance with some example embodiments.

FIG. 3 is a schematic diagram illustrating data stored in a flash memory 116 of the IoT device 100, in accordance with some example embodiments. As shown in FIG. 3, the flash memory 116 may include a digital signature 302, a public key 304, an image hash value 306, an image cryptographic algorithm 308, and/or an image 310.

The manifest signature (also referred to as digital signature) 302 may be a value calculated based on a manifest and a private key. The manifest may refer to the public key 304, the image hash value 306, and/or the image cryptographic algorithm 308, collectively. The private key may be paired with the public key 304. Any information encrypted by a private key may be decrypted to the original information using a public key or vice versa. The private key may be unknown to anyone except the designer or manufacturer.

The IoT device 100 may decrypt the manifest signature 302 using the public key 304 to generate a first manifest hash value. The IoT device 100 may also generate a second manifest hash value based on the manifest using a cryptographic algorithm. The cryptographic algorithm may include a secure hash algorithm (SHA) and/or a message authentication code (MAC) algorithm, or other algorithm(s). The SHA algorithm may include an SHA-2 algorithm and/or an SHA-3 algorithm. The SHA-2 algorithm may include an SHA-224 algorithm, an SHA-256 algorithm, an SHA-384 algorithm, and/or an SHA-512 algorithm. In some embodiments, the secure boot of the IoT device may include comparing the first manifest hash value with the second manifest hash value.

The public key 304 may be a series of numbers created by a symmetric or asymmetric algorithm. The public key 304 may be generated with a paired private key based on the symmetric or asymmetric algorithm. For the symmetric algorithm, the generated public key 304 and the paired private key are the same. For the asymmetric algorithm, the generated public key 304 and the paired private key are different.

As described above, the public key 304 may be used to decrypt the manifest signature 302 to generate a first manifest hash value. The IoT device 100 may generate a public key hash value using a cryptographic algorithm based on the public key 304. The public key hash value may be compared with a public key hash value pre-stored in the OTP memory 108 (e.g., public key hash value 204).

The image hash value 306 may be a value generated based on the image 310 using a cryptographic algorithm (e.g., image cryptographic algorithm 308). The image hash value 306 may be preset during the manufacture of the IoT device 100. In some embodiments, the secure boot of the IoT device 100 may include a secure check operation of comparing the image hash value 306 with a reference image hash value, that is calculated based on the image 310 and the image cryptographic algorithm 308. The image hash value 306 should be the same as the reference image hash value by default. However, if the image 310 is modified by attacker, the reference image hash value will be different from the image hash value 306. In that case, the IoT device 100 may determine that an attack occurs and generate a notification. Details regarding such comparison may be found elsewhere in the present disclosure. See, e.g., operation 510 in FIG. 5 and operation 610 in FIG. 6, and the descriptions thereof.

The image cryptographic algorithm 308 may include a secure hash algorithm (SHA) and/or a message authentication code (MAC) algorithm, or other algorithm(s). The image cryptographic algorithm 308 may be same or different from other cryptographic algorithms used in the secure boot of the IoT device. The SHA algorithm may include an SHA-2 algorithm and/or an SHA-3 algorithm. The SHA-2 algorithm may include an SHA-224 algorithm, an SHA-256 algorithm, an SHA-384 algorithm, and/or an SHA-512 algorithm. Merely by way of example, the image hash value 306 is generated using the SHA-256 algorithm and is 256-bit long.

It should be noted that the image 310 used herein may refer to a code image of executable programs rather than pictures. After the secure boot of the IoT device 100 is passed, the image 310 may be executed by the IoT device 100 to perform certain functions.

Figure 4A:
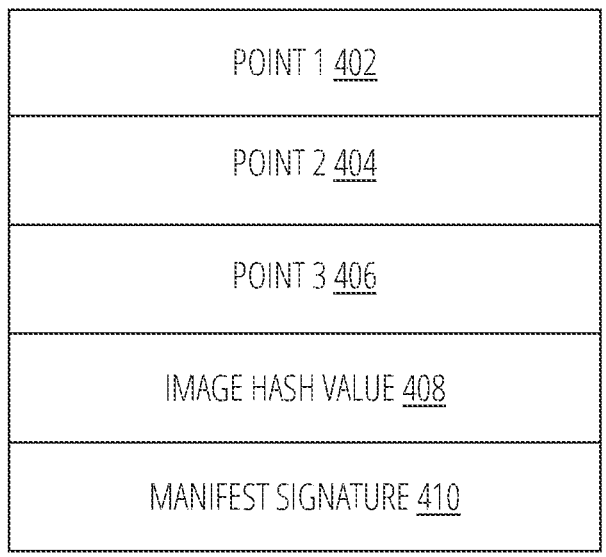
FIG. 4A is a schematic diagram illustrating data stored in a first register memory of the IoT device, in accordance with some example embodiments.

FIG. 4A is a schematic diagram illustrating data stored in a first register memory of the IoT device, in accordance with some example embodiments. As shown in FIG. 4A, the register memory-1 126 may include a plurality of data points (e.g., point 1 402, point 2 404, and point 3 406), an image hash value 408, and a manifest signature 410. By default, all the data values in the register memory-1 126 are zero before the secure boot of the IoT device 100.

The plurality of data points may each correspond to one or more consecutive bits in the register memory-1 126. Merely by way of example, each data point corresponds to 32 pre-allocated bits (or eight hexadecimal numbers) in the register memory-1 126. However, it shall not be limiting; the plurality of data points may be of other lengths and/or even of different lengths.

In some embodiments, preset values may be written (by software) on the plurality of data points during a secure boot of the IoT device 100. Specifically, the secure boot of the IoT device 100 may include three secure check operations:

1. checking whether a first public key value read directly from the OTP memory (e.g., the public key hash value 204 of the OTP memory 108) is the same as a second public key value calculated by a public key read from a flash memory (e.g., the public key 304 of the flash memory 116) and a cryptographic algorithm.
2. checking whether a first digital signature value, calculated based on signature data using a cryptographic algorithm from the flash memory (e.g., flash memory 116) is the same as a second digital signature, generated based on a digital signature (e.g., manifest signature 302) read from the flash memory and a public key (e.g., public key 304) read from the flash memory.
3. checking whether a first image key (e.g., image hash value 306) read directly from the flash memory (e.g., flash memory 116) is the same as a second image key, wherein the second image key is generated based on a code image (e.g., image 310) read from the flash memory using an image cryptographic algorithm (e.g., image cryptographic algorithm 308).

After each operation is performed, a preset 32-bit value may be written on one of the plurality of data points. For example, after performing the secure check operation 1, a value of 0x1234abcd may be written on the point 1 402. Similarly, after performing the secure check operation 2, a value of 0xdeadbeef may be written on the point 2 404. After performing the secure check operation 3, a value of 0x51525354 may be written on the point 3 406. It should be noted that the values used herein are merely examples and shall not be limiting. Other same or different values may be used and are protected by the scope of the present disclosure.

In addition, after finishing the three secure check operations, the IoT device 100 may write the second image key (or a part thereof, e.g., first 16 bits, first 32 bits) generated in the secure check operation 3 on the image hash value 408. The IoT device 100 may also write the second digital signature (or a part thereof, e.g., first 16 bits, first 32 bits) generated in the secure check operation 2 on the manifest signature 410. The values written on the register memory-1 126 may be compared with values written on the register memory-2

128. Details regarding the comparison between the register memories may be found elsewhere in present disclosure. See, e.g., method 700 in FIG. 7 and the descriptions thereof.

In some embodiments, the register memory-1 126 may be designed to be a small memory, e.g., with a size of 32 bits.

Figure 4B:
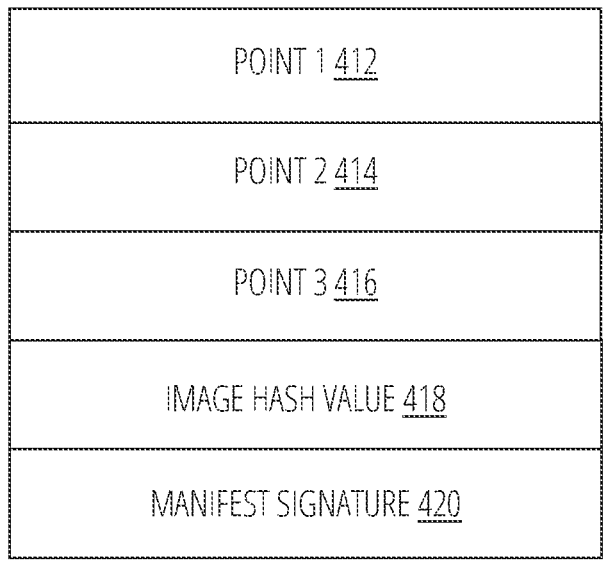
FIG. 4B is a schematic diagram illustrating data stored in a second register memory of the IoT device, in accordance with some example embodiments.

FIG. 4B is a schematic diagram illustrating data stored in a second register memory of the IoT device, in accordance with some example embodiments. As shown in FIG. 4B, the register memory-2 128 may include a plurality of data points (e.g., point 1 412, point 2 414, and point 3 416), an image hash value 418, and a manifest signature 420. In some embodiments, preset values are permanently written (by hardware) on the plurality of data points in the register memory-2 128 by a manufacturer before the IoT device 100 is released to the public.

In some embodiments, the format (e.g., length) of each of the plurality of data points in the register memory-2 128 is similar to the corresponding data point of the plurality of data points in the register memory-1 126. Specifically, different data points in the same register memory do not need to have the same data format or data size, but the corresponding data points in the register memory-1 126 and the register memory-2 128 should have the same data format and data size. For example, the point 1 412 and the point 1 402 are both 32-bit long while the point 2 414 and the point 2 404 are both 64-bit long. As another example, all of the plurality of data points in the register memory-1 126 and the register memory-2 128 are 32-bit long.

In some embodiments, the preset values that are permanently written on the plurality of data points in the register memory-2 128 during manufacture of the IoT device 100 may be the same as the preset values that are written by software on the plurality of data points in the register memory-1 126 during secure boot. Taking the same examples as above, a value of 0x1234abcd, a value of 0xdeadbeef, and a value of 0x51525354 may be written on the point 1 412, point 2 414, and point 3 416, respectively.

When a fault injection attack occurs, the values in the register memory-1 126 written by the software are changed, while the permanently written values in the register memory-2 128 remain the same. Thus, whenever a fault injection attack occurs, the values in two register memories will not match anymore.

The unmatched points can also indicate during or after which operation the attack occurs. The IoT device 100 may also identify a skipped operation if points in two register memories 126 and 128 are unmatched and the point in the register memory-1 126 is zero.

In addition, after finishing the three secure check operations, the IoT device 100 may write the second image key (or a part thereof, e.g., first 16 bits, first 32 bits) generated in the secure check operation 3 on the image hash value 418. The IoT device 100 may also write the second digital signature (or a part thereof, e.g., first 16 bits, first 32 bits) generated in the secure check operation 2 on the manifest signature 420. In some embodiments, the values of the image hash value 418 and the manifest signature 420 are preset to be non-zero (e.g., 0xffffffff), while the values of the image hash value 408 and the manifest signature 410 are preset to be zero. If the secure boot of the IoT device 100 is not attacked, the image hash values and manifest signatures in both register memories are overwritten to be the same values after all three secure check operations are performed. However, if a fault injection attack occurs, the values in two register memories will not match.

In some embodiments, the register memory-2 128 may be designed to be a small memory, e.g., with a size of 32 bits.

Figure 4C:
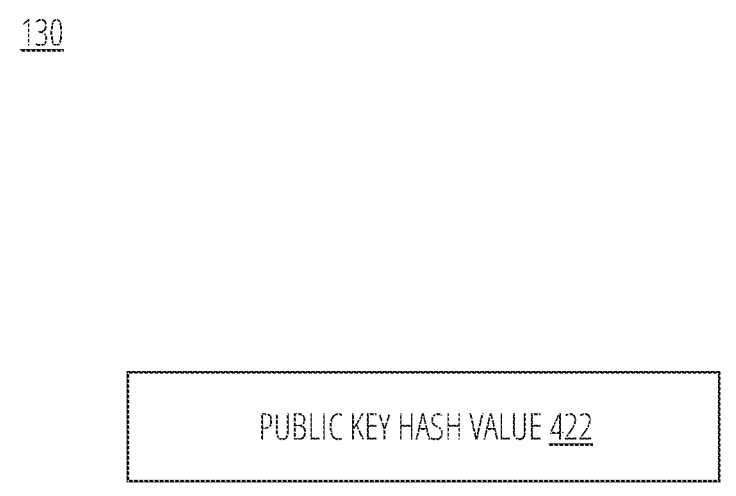

FIG. 4C is a schematic diagram illustrating data stored in a third register memory of the IoT device, in accordance with some example embodiments. As shown in FIG. 4C, the register memory-3 130 may include a public key hash value 422. For example, after finishing all three secure check operations or at least the secure check operation 1, the IoT device 100 may write the calculated second public key value on the public key hash value 422 of the register memory-3 130. The public key hash value 422 may then be compared with the public key hash value 204 pre-stored in the OTP memory 108. If the secure boot of the IoT device 100 is not attacked, the public key hash value 204 will match with the public key hash value 422. However, if a fault injection attack occurs, the values will not match. In some embodiments, the register memory-3 130 may be combined with the register memory-1 126 or the register memory-2 128.

Figure 5:
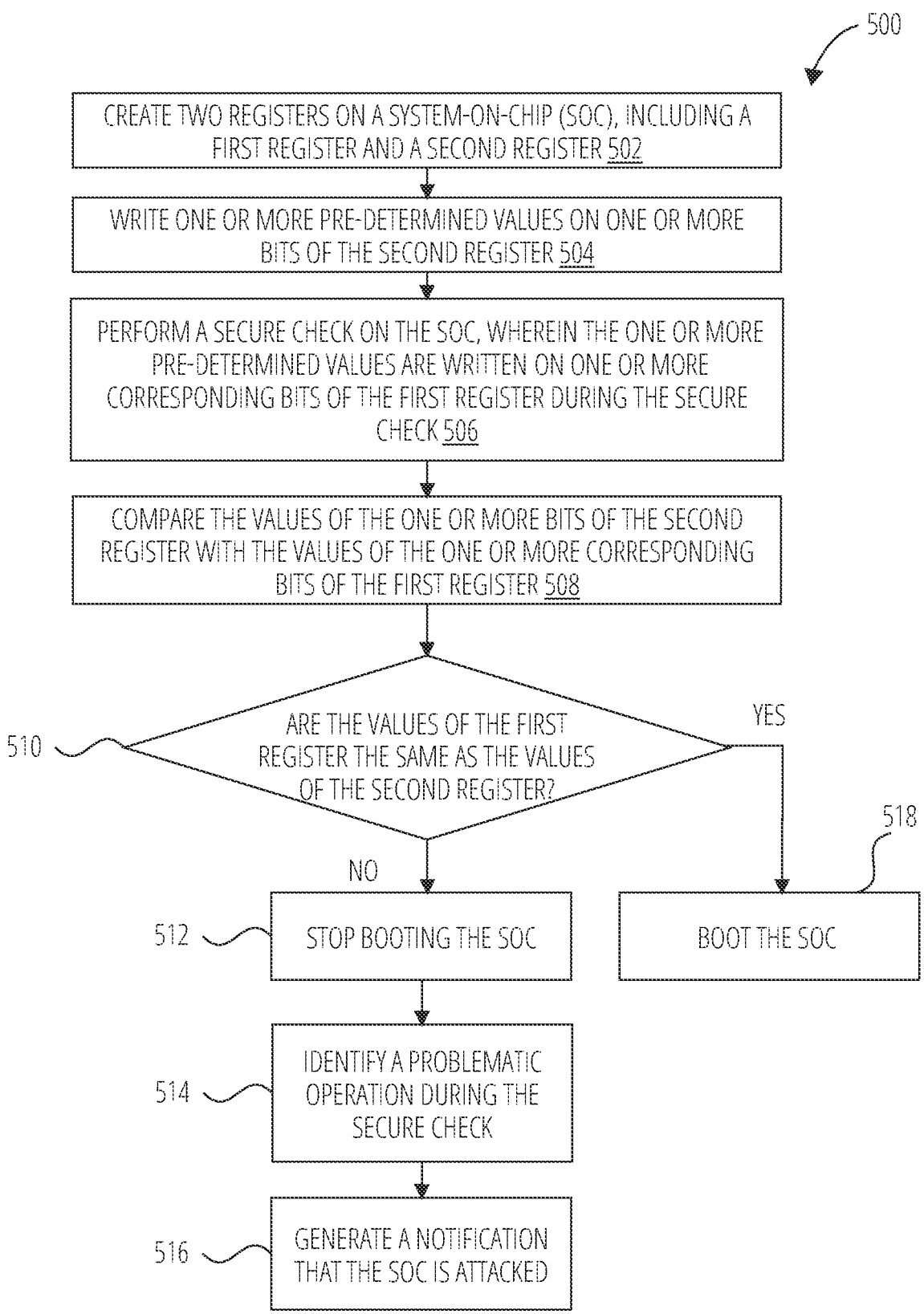
FIG. 5 is a flowchart illustrating operations of the IoT device in performing a method for performing a secure boot, in accordance with some example embodiments.

FIG. 5 is a flowchart illustrating operations of the IoT device in performing a method for performing a secure boot, in accordance with some example embodiments. The method 500 may be embodied in computer-readable instructions for execution by one or more processors such that operations of the method 500 may be performed in part or in whole by the functional components of the IoT device 100; accordingly, the method 500 is described below by way of example with reference thereto. However, it shall be appreciated that at least some of the operations of the method 500 may be deployed on various other hardware configurations than the IoT device 100. Also, the operations of the method 500 may be partially omitted, or performed in any order.

In operation 502, two registers (or register memories) are created on a system-on-chip (SoC). The two registers may include a first register (e.g., register memory-1 126) and a second register (e.g., register memory-2 128). As used herein, the term "create" may refer to a hardware design that mounts two register memories on the SoC or a software design that allocates specific memory spaces or addresses of existing memories or processors to form the register memory. In some embodiments, more registers may be created. For example, a third register (e.g., register memory-3 130) that stores a public key hash value may be created.

In operation 504, one or more pre-determined values may be written on one or more bits of the second register. The one or more pre-determined values may be permanently written on the one or more bits of the second register during the manufacture of the IoT device 100.

In operation 506, the IoT device 100 may perform a secure check on the SoC. The one or more same pre-determined values may be written on one or more corresponding bits of the first register during the secure check. In some embodiments, the secure check may include one or more secure check operations. A corresponding pre-determined value may be written by software on one group of bits (or a data point) of the first register after each secure check operation is performed.

In operation 508, the IoT device 100 may compare the values of the one or more bits of the second register with the values of the one or more corresponding bits of the first register. In some embodiments, the first and second registers may each include a plurality of data points. The operation 508 may include comparing whether each of the plurality of data points in the first register is the same as a corresponding data point of the plurality of data points in the second register. The operation 508 may also include comparing other secure information written on the first register and the second register, e.g., compare image hash value 408 with image hash value 418 and compare manifest signature 410 with manifest signature 420. In some embodiments, the operation 508 may be performed after all the secure check operations are performed. Alternatively, the operation 508 may be performed during the secure check after each of the secure check operations is performed or some of the secure check operations are performed.

In operation 510, the IoT device 100 may determine whether the values of the first register are the same as the values of the second register. In response to a comparison result that the values of the first register are the same as the values of the second register, the method 500 may proceed to operation 518 and the IoT device 100 may boot the SoC; otherwise, the method 500 may proceed to operation 512. It should be noted that the secure check operations are preliminary conditions that have to be passed beside the test disclosed by the present disclosure from operations 502 to 510. If the secure check operation is not passed, the method 500 may still proceed to operation 512, where the booting of the SoC is stopped.

In operation 512, the IoT device 100 may stop booting the SoC. For example, the IoT device 100 may generate a non-maskable interrupt (NMI) to stop the booting of the SoC. The NMI is a hardware interrupt that cannot be ignored by standard interrupt masking techniques in the IoT device 100. It is typically used to signal attention for non-recoverable hardware errors or attacks.

In operation 514, the IoT device 100 may identify a problematic operation during the secure check. Details regarding determining the problematic secure check operation may be found in method 700 in FIG. 7 and the descriptions thereof.

In operation 516, the IoT device 100 may generate a notification that the SoC is attacked. If the problematic secure check operation is identified in operation 514, the notification may further include an identification of the problematic secure check operation. In some embodiments, the notification may be generated to one or more components of the IoT device 100. Additionally, or alternatively, the notification may be generated to an external device (e.g., a user mobile device, a server) via, e.g., the communication interface 120.

Figure 6:
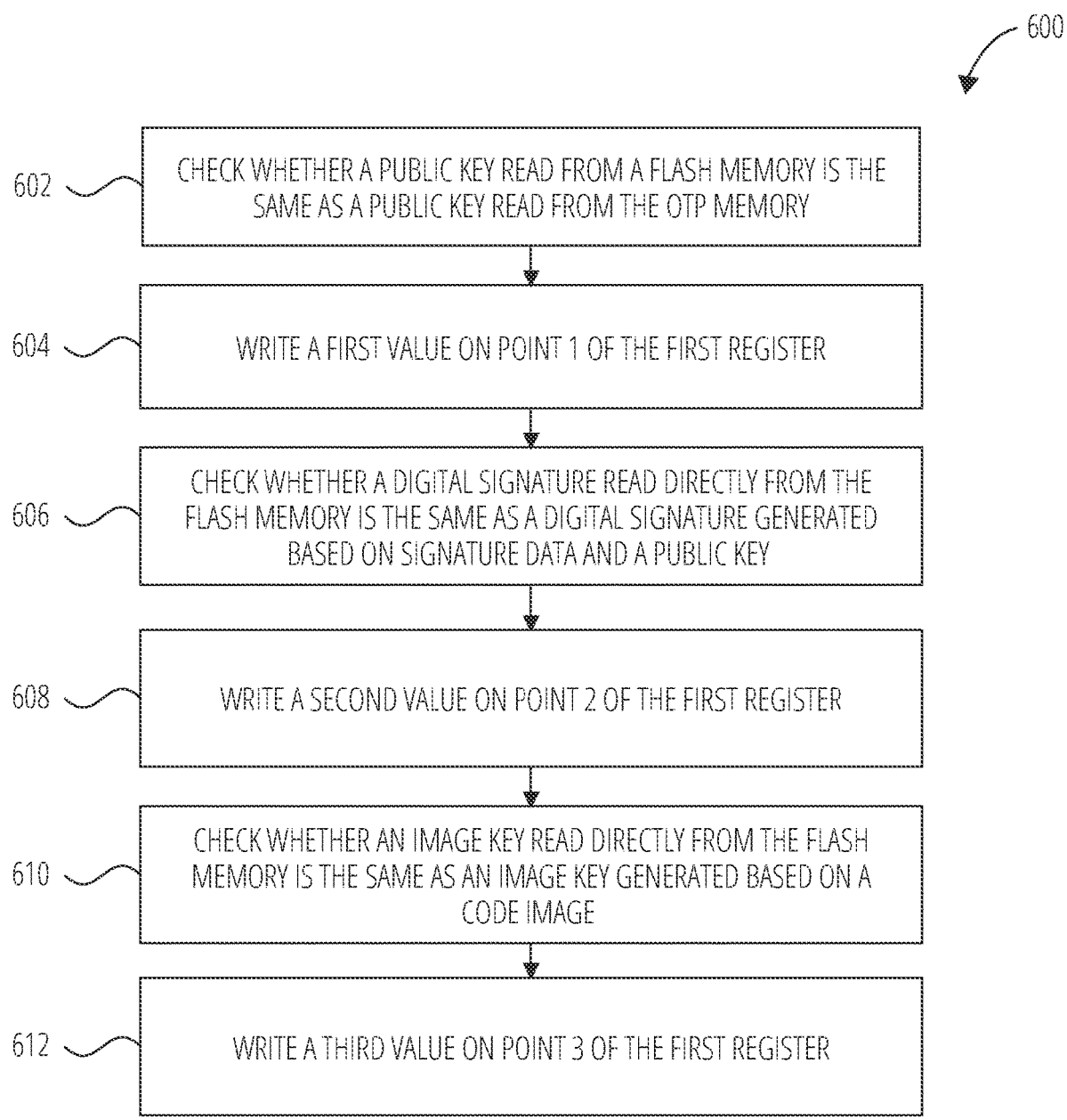
FIG. 6 is a flowchart illustrating operations of the IoT device in performing a method for writing values on points of the first register, in accordance with some example embodiments.

FIG. 6 is a flowchart illustrating operations of the IoT device in performing a method for writing values on points of the first register, in accordance with some example embodiments. The method 600 may be embodied in computer-readable instructions for execution by one or more processors such that operations of the method 600 may be performed in part or in whole by the functional components of the IoT device 100; accordingly, the method 600 is described below by way of example with reference thereto. However, it shall be appreciated that at least some of the operations of the method 600 may be deployed on various other hardware configurations than the IoT device 100. Also, the operations of the method 600 may be partially omitted, or performed in any order.

In operation 602, the IoT device 100 may check whether a first public key value read directly from the OTP memory (e.g., the public key hash value 204 of the OTP memory 108) is the same as a second public key value calculated by a public key read from a flash memory (e.g., the public key 304 of the flash memory 116) and a cryptographic algorithm. If the first public key value is different from the second public key value, the method 600 may terminate, and the booting of the SoC may be stopped; otherwise, the method 600 may proceed to operation 604.

In operation 604, the IoT device 100 may write a first value on point 1 of the first register. For example, a value of 0x1234abcd may be written on the point 1 402 of the register memory-1 126.

In operation 606, the IoT device 100 may checking whether a first digital signature value, calculated based on signature data using a cryptographic algorithm from the flash memory (e.g., flash memory 116) is the same as a second digital signature, generated based on a digital signature (e.g., manifest signature 302) read from the flash memory and a public key (e.g., public key 304) read from the flash memory. If the first digital signature value is different from the second digital signature value, the method 600 may terminate, and the booting of the SoC may be stopped; otherwise, the method 600 may proceed to operation 608.

In operation 608, the IoT device 100 may write a second value on point 2 of the first register. For example, a value of 0xdeadbeef may be written on the point 2 404 of the register memory-1 126.

In operation 610, the IoT device 100 may check whether a first image key (e.g., image hash value 306) read directly from the flash memory (e.g., flash memory 116) is the same as a second image key, wherein the second image key is generated based on a code image (e.g., image 310) read from the flash memory using an image cryptographic algorithm (e.g., image cryptographic algorithm 308). If the first image key is different from the second image key, the method 600 may terminate, and the booting of the SoC may be stopped; otherwise, the method 600 may proceed to operation 612.

In operation 612, the IoT device 100 may write a third value on point 3 of the first register. For example, a value of 0x51525354 may be written on the point 3 406 of the register memory-1 126.

In some embodiments, after finishing the three secure check operations, the IoT device 100 may write the second image key (or a part thereof, e.g., first 16 bits, first 32 bits) generated in the secure check operation 3 on the image hash value 408. The IoT device 100 may also write the second digital signature (or a part thereof, e.g., first 16 bits, first 32 bits) generated in the secure check operation 2 on the manifest signature 410.

It should be noted that the values used herein are merely examples and shall not be limiting. Other same or different values may be used and are protected by the scope of the present disclosure. Also, the examples provided in the present disclosure write one pre-determined value after each secure check operation is performed. However, it shall not be limiting. For example, two or more values may be written on two or more data points after an operation is performed. As another example, no value is written after an operation is performed. Such variations shall be protected by the present disclosure.

Figure 7:
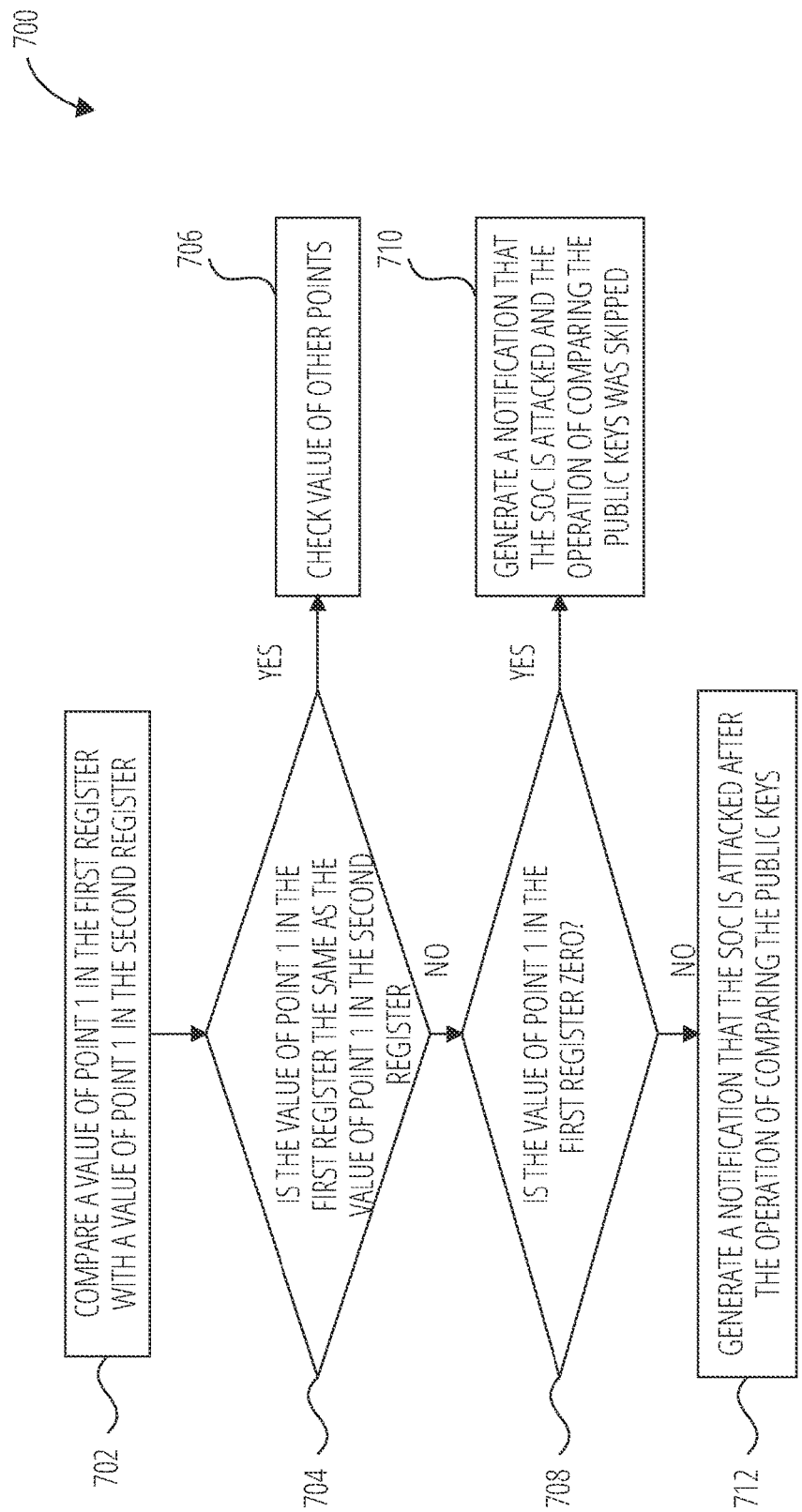
FIG. 7 is a flowchart illustrating operations of the IoT device in performing a method for performing a secure check based on values written on the registers, in accordance with some example embodiments.

FIG. 7 is a flowchart illustrating operations of the IoT device in performing a method for performing a secure check based on values written on the registers, in accordance with some example embodiments. The method 700 may be embodied in computer-readable instructions for execution by one or more processors such that operations of the method 700 may be performed in part or in whole by the functional components of the IoT device 100; accordingly, the method 700 is described below by way of example with reference thereto. However, it shall be appreciated that at least some of the operations of the method 700 may be deployed on various other hardware configurations than the IoT device 100. Also, the operations of the method 700 may be partially omitted, or performed in any order. The method 700 may be performed after all the secure check operations are performed or after a corresponding secure check operation is performed.

In operation 702, the IoT device 100 may compare a value of point 1 (e.g., point 1 402) in the first register (e.g., register memory-1 126) with a value of point 1 (e.g., point 1 412) in the second register (e.g., register memory-2 128). Based on the previous examples, a value of 0x1234abcd is permanently written on the point 1 412 during the manufacture of the IoT device 100. In theory, the same value of 0x1234abcd is also written by software on the point 402. However, when a fault injection attack occurs, the values in the first register memory written by the software are changed, while the permanently written values in the second register memory remain the same. Thus, whenever a fault injection attack occurs, the values in two register memories will not match anymore.

In operation 704, the IoT device 100 may determine whether the value of point 1 in the first register is the same as the value of point 1 in the second register. In response to a comparison result that the value of point 1 in the first register is the same as the value of point 1 in the second register, the method 700 may proceed to operation 706. In other words, the IoT device 100 may determine that it is not attacked during or after the first operation. In operation 706, the IoT device 100 continue to perform a similar check on other points. In response to a comparison result that the value of point 1 in the first register is not the same as the value of point 1 in the second register, the method 700 may proceed to operation 708. In other words, the IoT device 100 may determine that it is attacked during the first operation, but it may want to check whether the first operation is skipped or attacked.

In operation 708, the IoT device 100 may determine whether the value of point 1 in the first register is zero (default value). In response to a determination that the value of point 1 in the first register is zero, the IoT device 100 may determine that the first secure check operation is skipped and the method 700 proceeds to operation 710; otherwise, the IoT device 100 may determine that the first secure check operation is not skipped and the IoT device 100 is attacked during or after the first secure check operation is performed.

In operation 710, the IoT device 100 may generate a notification that the SoC is attacked and the operation of comparing the public key hash values (first secure check operation) is skipped. In some embodiments, the notification may be generated to one or more components of the IoT device 100.

Additionally, or alternatively, the notification may be generated to an external device (e.g., a user mobile device, a server) via, e.g., the communication interface 120.

In operation 712, the IoT device 100 may generate a notification that the SoC is attacked during or after the operation of comparing the public keys (first secure check operation) is performed.

Figure 8:
FIG. 8 is a flowchart illustrating operations of the IoT device in performing a method for checking a secure boot flag, in accordance with some example embodiments.

FIG. 8 is a flowchart illustrating operations of the IoT device in performing a method for checking a secure boot flag, in accordance with some example embodiments. The method 800 may be embodied in computer-readable instructions for execution by one or more processors such that operations of the method 800 may be performed in part or in whole by the functional components of the IoT device 100; accordingly, the method 800 is described below by way of example with reference thereto. However, it shall be appreciated that at least some of the operations of the method 800 may be deployed on various other hardware configurations than the IoT device 100. Also, the operations of the method 800 may be partially omitted, or performed in any order.

In some embodiments, a secure boot flag may have one or more bits. Based on a preset correlation, the one or more bits may refer to a Boolean value of "True" or "False." For example, "b00000001" may refer to "True," and "b00000000" may refer to "False." Alternatively, "0xabcd-abcd" may refer to "True," and 0x12345678 may refer to "False." A "True" is also named an "On" status, and a "False" is also named an "Off" status. The correlation between bit values and Boolean values is preset during the manufacture of the IoT device 100 and shall not be limiting. When the secure boot flag is at an "On" status, secure check operations are performed; when the secure boot flag is at an "Off" status, secure check operations are skipped.

In theory, a secure boot flag would accurately reflect a manufacturer's configuration on the secure check of the IoT device 100. However, when a software program is used to check the status of the secure boot flag, a fault injection attacker may either change a software reading result of the secure boot flag from an "On" status to an "Off" status, or directly change the secure boot flag from an "On" status to an "Off" status. Either attack may cause the secure check operations to be skipped. Then, malware, viruses, and damaged documents are executed without a secure check. It is therefore important to investigate whether an "Off" status is actively configured by a manufacturer or maliciously caused by an attacker. The present disclosure writes values on the secure boot flag (e.g., secure boot flag 202) of an OTP memory (e.g., OTP memory 108) that cannot be easily modified by fault injection attacks. Even if the software reading result is modified by the attack, the hardware reading result will be accurate.

In operation 802, the IoT device 100 may execute a software program to determine the status of a secure boot flag (e.g., secure boot flag 202 of OTP memory 108).

In operation 804, the IoT device 100 may determine whether the secure boot flag is at an "On" status based on the result of the software program. In response to a determination that the secure boot flag is at an "On" status, the method 800 proceeds to operation 806 and the secure check is performed; otherwise, the method 800 proceeds to operation 808.

In operation 808, the IoT device 100 may execute hardware (e.g., electronic circuits) to determine the status of the secure boot flag.

In operation 810, the IoT device 100 may determine whether the secure boot flag is at an "On" status based on the result of the hardware. In response to a determination that the secure boot flag is at an "On" status, the method 800 may proceed to operation 812; otherwise, the method 800 may proceed to operation 816

In operation 812, the IoT device 100 may perform a secure check. If the secure check is passed, the IoT device 100 may determine that although the hardware result and software result of the secure boot flag is unmatched, the SoC can boot securely. In some embodiments, the IoT device 100 may further change the software result of the secure boot flag to the "On" status. Optionally, in operation 814, the IoT device 100 may generate a notification that the SoC is attacked. In operation 816, the IoT device 100 may boot the SoC without performing the secure check.

EXAMPLES

1. A method comprising:
performing a secure check on a System-on-Chip (SoC), wherein one or more pre-determined values are written on one or more bits of a first register of the SoC during the secure check;
reading one or more corresponding bits of a second register of the SoC, wherein the one or more pre-determined values are pre-written on the one or more bits of the second register;
comparing the values of the one or more bits of the second register with the values of the one or more corresponding bits of the first register; and
in response to a comparison result that the values of the one or more bits of the second register are the same as the values of the one or more corresponding bits of the first register, booting the SoC.

2. The method of example 1, wherein the one or more pre-determined values are permanently written on the one or more bits of the second register.

3. The method of any of the preceding examples, wherein the secure check comprises:
checking whether a first public key value read directly from an OTP memory is the same as a second public key value calculated by a public key read from a flash memory and a cryptographic algorithm.

4. The method of any of the preceding examples, wherein the secure check comprises:
checking whether a first digital signature value calculated based on signature data using a cryptographic algorithm from a flash memory is the same as a second digital signature, wherein the second digital signature value is generated based on a digital signature read from the flash memory and a public key read from the flash memory.

5. The method of any of the preceding examples, wherein the secure check comprises:
checking whether a first image key read directly from a flash memory is the same as a second image key, wherein the second image key is generated based on a code image read from the flash memory.

6. The method of any of the preceding examples, wherein the one or more corresponding bits of the first register include at least one point and wherein the secure check comprises performing at least one operation, the method further comprising:
writing the one or more pre-determined values on each of the at least one point after performing each of the at least one operation.

7. The method of example 6, further comprising:
in response to a comparison result that the values of the one or more bits of the second register are different from the one or more corresponding bits of the first register,
stopping booting the SoC;
identifying a problematic point among the at least one point of the first register, wherein the problematic point has a value different from the corresponding values of the one or more bits of the second register; and
identifying a problematic operation, wherein the problematic point was written after the problematic operation is performed.

8. The method of example 7, further comprising:
determining that the value of the problematic point is at an initial value; and
generating a notification that the SoC is attacked during the secure check with the problematic operation skipped.

9. The method of example 7, further comprising:
determining that the value of the problematic point is not at an initial value; and
generating a notification that the SoC is attacked during the secure check after the problematic operation is performed.

10. The method of any of the preceding examples, further comprising:
executing a software program to determine that a secure boot flag is at an "Off" status;
executing a hardware circuit to determine that the secure boot flag is at an "On" status; and
in response to the comparison result that the values of the one or more bits of the second register are the same as the one or more corresponding bits of the first register, booting the SoC; and
generating a notification that the SoC is attacked and the secure boot flag is changed from the "On" status to the "Off" status.

11. The method of example 10, further comprising:
changing the secure boot flag read by the software program to the "On" status.

12. A system-on-chip (SoC) comprising:
a second register configured to store one or more bits, wherein one or more pre-determined values are pre-written on the one or more bits of the second register; and
a processor configured to:
perform a secure check on the SoC, wherein the one or more pre-determined values are written on one or more corresponding bits of a first register of the SoC during the secure check;
read the one or more bits from the second register;
compare the values of the one or more bits of the second register with the values of the one or more corresponding bits of the first register; and
in response to a comparison result that the values of the one or more bits of the second register are the same as the values of the one or more corresponding bits of the first register, boot the SoC.

13. The SoC of example 12, wherein the one or more pre-determined values are permanently written on the one or more bits of the second register.

14. The SoC of any of the preceding examples, wherein the one or more corresponding bits of the first register include at least one point, the secure check comprises performing at least one operation, and the processor is further configured to:
write the one or more pre-determined values on each of the at least one point after performing each of the at least one operation.

15. The SoC of example 14, wherein the processor is further configured to:
in response to a comparison result that the values of the one or more bits of the second register are different from the one or more corresponding bits of the first register,
stop booting the SoC;
identify a problematic point among the at least one point of the first register, wherein the problematic point has a value different from the corresponding values of the one or more bits of the second register; and identify a problematic operation, wherein the problematic point was written after the problematic operation is performed.

16. The SoC of example 15, wherein the processor is further configured to:
determine that the value of the problematic point is at an initial value; and
generate a notification that the SoC is attacked during the secure check with the problematic operation skipped.

17. The SoC of example 16, wherein the processor is further configured to:
determine that the value of the problematic point is not at an initial value; and
generate a notification that the SoC is attacked during the secure check after the problematic operation is performed.

18. The SoC of any of the preceding examples, wherein the processor is further configured to:
execute a software program to determine that a secure boot flag is at an "Off" status;
execute a hardware circuit to determine that the secure boot flag is at an "On" status; and
in response to the comparison result that the values of the one or more bits of the second register are the same as the one or more corresponding bits of the first register, boot the SoC; and
generate a notification that the SoC is attacked and the secure boot flag is changed from the "On" status to the "Off" status.

19. The SoC of example 18, wherein the processor is further configured to:
change the secure boot flag read by the software program to the "On" status.

20. A non-transitory computer-readable storage medium, the computer-readable storage medium including instructions that when executed by a computer, cause the computer to:
perform a secure check on a System-on-Chip (SoC), wherein one or more pre-determined values are written on one or more bits of a first register of the SoC during the secure check;
read one or more corresponding bits of a second register of the SoC, wherein the one or more pre-determined values are pre-written on the one or more bits of the second register;
compare the values of the one or more bits of the second register with the values of the one or more corresponding bits of the first register; and
in response to a comparison result that the values of the one or more bits of the second register are the same as the values of the one or more corresponding bits of the first register, boot the SoC.

CONCLUSION

The present disclosure compares pre-determined values in two register memories to determine whether an IoT device is attacked. When a fault injection attack occurs, the software-written values in a first register memory are changed while the hardware-written values in the second register memory remain the same. Thus, the values in two register memories will not match anymore. If one of multiple points is written on the first register after each of one or more secure check operations during the secure boot, the unmatched points can also indicate during or after which operation the attack occurs. Therefore, the present disclosure has at least the following four advantages: 1. Register memories written by hardware have better resistance (almost absolute resistance) to fault injection attacks. 2. Secure boot operation(s) during which the fault injection attack(s) occurs can be easily identified. 3. The overall process of secure boot/secure check is minimally modified. 4. The hardware-based attack resistance method is compatible with a software-based attack resistance method.

What is claimed is:

1. A method comprising:
performing a secure check on a System-on-Chip (SoC), wherein one or more pre-determined values are written on one or more bits of a first register of the SoC during the secure check, wherein the one or more bits of the first register include at least one point, the at least one point each corresponding to a bit or a group of bits at a location in the first register and wherein the secure check comprises performing at least one operation;
writing the one or more pre-determined values on each of the at least one point after performing each of the at least one operation;
reading one or more corresponding bits of a second register of the SoC, wherein the one or more pre-determined values are pre-written on the one or more bits of the second register;
comparing the values of the one or more bits of the second register with the values of the one or more corresponding bits of the first register;
in response to a comparison result that the values of the one or more bits of the second register are the same as the values of the one or more corresponding bits of the first register, booting the SoC; and
in response to a comparison result that the values of the one or more bits of the second register are different from the one or more corresponding bits of the first register,
stopping booting the SoC;
identifying a problematic point among the at least one point of the first register, wherein the problematic point has a value different from the corresponding values of the one or more bits of the second register; and
identifying a problematic operation, wherein the problematic point was written after the problematic operation is performed.

2. The method of claim 1, wherein the one or more pre-determined values are permanently written on the one or more bits of the second register.

3. The method of claim 1, wherein the secure check comprises:
checking whether a first public key value read directly from an OTP memory is the same as a second public key value calculated by a public key read from a flash memory and a cryptographic algorithm.

4. The method of claim 1, wherein the secure check comprises:
checking whether a first digital signature value calculated based on signature data using a cryptographic algorithm from a flash memory is the same as a second digital signature, wherein the second digital signature value is generated based on a digital signature read from the flash memory and a public key read from the flash memory.

5. The method of claim 1, wherein the secure check comprises:
checking whether a first image key read directly from a flash memory is the same as a second image key, wherein the second image key is generated based on a code image read from the flash memory.

6. The method of claim 1, further comprising:
determining that the value of the problematic point is at an initial value; and
generating a notification that the SoC is attacked during the secure check with the problematic operation skipped.

7. The method of claim 1, further comprising:
determining that the value of the problematic point is not at an initial value; and
generating a notification that the SoC is attacked during the secure check after the problematic operation is performed.

8. The method of claim 1, further comprising:
executing a software program to determine that a secure boot flag is at an "Off" status;
executing a hardware circuit to determine that the secure boot flag is at an "On" status; and
in response to the comparison result that the values of the one or more bits of the second register are the same as the one or more corresponding bits of the first register, booting the SoC; and
generating a notification that the SoC is attacked and the secure boot flag is changed from the "On" status to the "Off" status.

9. The method of claim 8, further comprising:
changing the secure boot flag read by the software program to the "On" status.

10. A system-on-chip (SoC) comprising:
a second register configured to store one or more bits, wherein one or more pre-determined values are pre-written on the one or more bits of the second register; and
a processor configured to:
    perform a secure check on the SoC, wherein the one or more pre-determined values are written on one or more corresponding bits of a first register of the SoC during the secure check, wherein the one or more bits of the first register include at least one point, the at least one point each corresponding to a bit or a group of bits at a location in the first register and wherein the secure check comprises performing at least one operation;
    write the one or more pre-determined values on each of the at least one point after performing each of the at least one operation;
    read the one or more bits from the second register;
    compare the values of the one or more bits of the second register with the values of the one or more corresponding bits of the first register;
    in response to a comparison result that the values of the one or more bits of the second register are the same as the values of the one or more corresponding bits of the first register, boot the SoC; and
    in response to a comparison result that the values of the one or more bits of the second register are different from the one or more corresponding bits of the first register,
        stop booting the SoC;
        identify a problematic point among the at least one point of the first register, wherein the problematic point has a value different from the corresponding values of the one or more bits of the second register; and
        identify a problematic operation, wherein the problematic point was written after the problematic operation is performed.

11. The SoC of claim 10, wherein the one or more pre-determined values are permanently written on the one or more bits of the second register.

12. The SoC of claim 10, wherein the processor is further configured to:
determine that the value of the problematic point is at an initial value; and
generate a notification that the SoC is attacked during the secure check with the problematic operation skipped.

13. The SoC of claim 12, wherein the processor is further configured to:
determine that the value of the problematic point is not at an initial value; and
generate a notification that the SoC is attacked during the secure check after the problematic operation is performed.

14. The SoC of claim 10, wherein the processor is further configured to:
execute a software program to determine that a secure boot flag is at an "Off" status;
execute a hardware circuit to determine that the secure boot flag is at an "On" status; and
in response to the comparison result that the values of the one or more bits of the second register are the same as the one or more corresponding bits of the first register, boot the SoC; and
generate a notification that the SoC is attacked and the secure boot flag is changed from the "On" status to the "Off" status.

15. The SoC of claim 14, wherein the processor is further configured to:
change the secure boot flag read by the software program to the "On" status.

16. A non-transitory computer-readable storage medium, the computer-readable storage medium including instructions that when executed by a computer, cause the computer to:
perform a secure check on a System-on-Chip (SoC), wherein one or more pre-determined values are written on one or more bits of a first register of the SoC during the secure check, wherein the one or more bits of the first register include at least one point, the at least one point each corresponding to a bit or a group of bits at a location in the first register and wherein the secure check comprises performing at least one operation;
write the one or more pre-determined values on each of the at least one point after performing each of the at least one operation;
read one or more corresponding bits of a second register of the SoC, wherein the one or more pre-determined values are pre-written on the one or more bits of the second register;
compare the values of the one or more bits of the second register with the values of the one or more corresponding bits of the first register;
in response to a comparison result that the values of the one or more bits of the second register are the same as the values of the one or more corresponding bits of the first register, boot the SoC; and
in response to a comparison result that the values of the one or more bits of the second register are different from the one or more corresponding bits of the first register, stop booting the SoC;
identify a problematic point among the at least one point of the first register, wherein the problematic point has a value different from the corresponding values of the one or more bits of the second register; and
identify a problematic operation, wherein the problematic point was written after the problematic operation is performed.

* * * * *